No. 12,293. REISSUED DEC. 6, 1904.

E. F. GWYNN.

FUEL BURNER.

APPLICATION FILED FEB. 9, 1904.

Witnesses
H. H. Clements
E. E. Potter.

Inventor,
E. F. Gwynn
By N. C. Everett & Co.
Attorneys.

No. 12,293. Reissued December 6, 1904.

UNITED STATES PATENT OFFICE.

EMMER F. GWYNN, OF PITTSBURG, PENNSYLVANIA.

FUEL-BURNER.

SPECIFICATION forming part of Reissued Letters Patent No. 12,293, dated December 6, 1904.

Original No. 738,537, dated September 8, 1903. Application for reissue filed February 9, 1904. Serial No. 192,851.

*To all whom it may concern:*

Be it known that I, EMMER F. GWYNN, a citizen of the United States of America, residing at Pittsburg, in the county of Allegheny and State of Pennsylvania, have invented certain new and useful Improvements in Fuel-Burners, of which the following is a specification, reference being had therein to the accompanying drawings.

This invention relates to certain new and useful improvements in fuel-burners, and relates more particularly to that type of burners employed for the burning of gas as a fuel.

The object of the present invention is to provide a burner by the aid of which the fuel may be economically used and to provide novel means for thoroughly mixing or commingling the gas and air to increase the combustion.

A still further object of the present invention is to provide novel and effective means for regulating the volume of gas admitted to the mixing-chamber or air-tube without affecting the velocity; furthermore, to dispense with the use of jets, nipples, and the like, and to feed the gas into the burner spirally or at any desired angle to the longitudinal axis and tangentially to the wall of the mixing-chamber or air-tube.

My invention further aims to provide means for artificially mixing the air and gas when it is found that the gas-pressure or intensity of draft is insufficient to accomplish the desired result, and for this purpose I preferably employ steam or air under pressure which is discharged through the side of the mixing-chamber or air-tube at any desired angle to the axis and tangentially to the wall of the mixing-chamber or air-tube.

With the above and other objects in view the invention consists in the novel construction, combination, and arrangement of parts to be hereinafter more specifically described and then particularly pointed out in the appended claims, and in describing the invention in detail reference will be had to the accompanying drawings, forming a part of this specification, and wherein like numerals of reference will be employed for designating like parts throughout the different views, in which—

Figure 1:
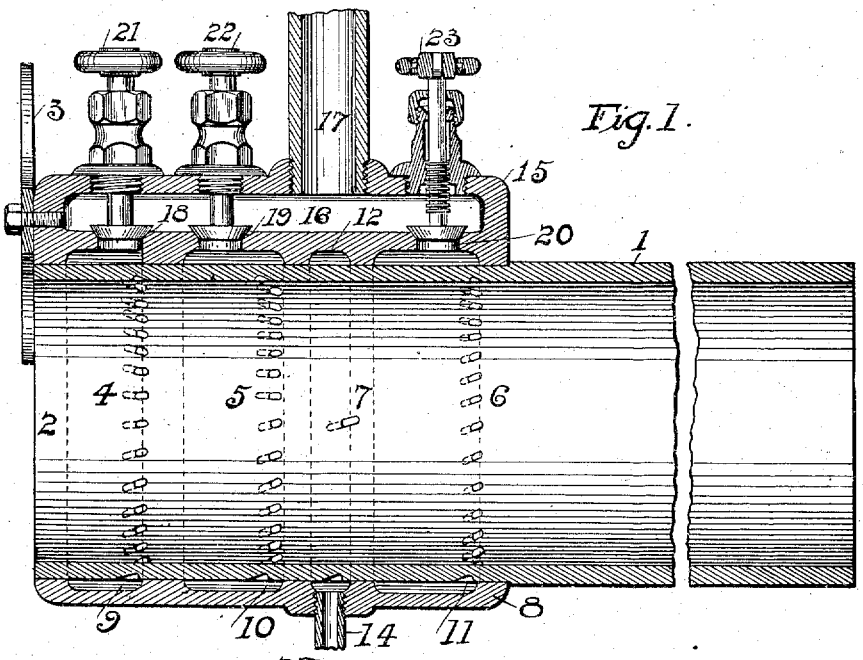
Figure 2:
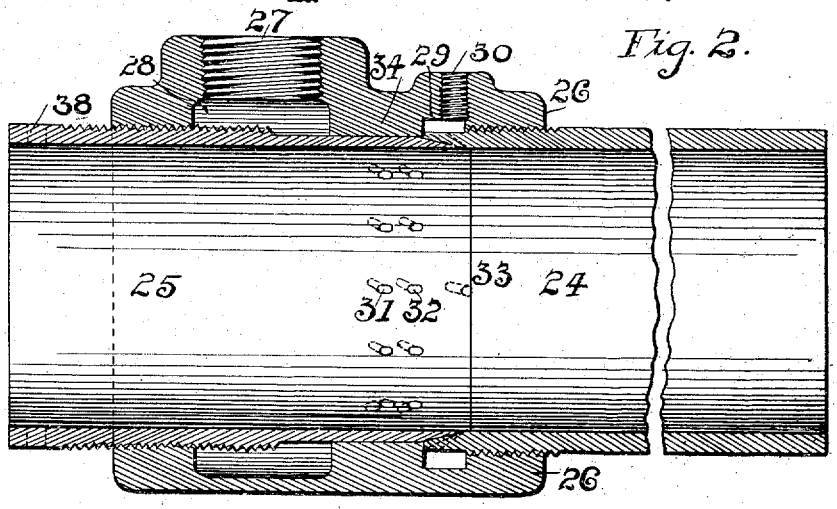
Figure 3:
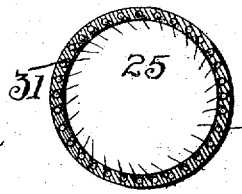

Figure 1 is a central longitudinal sectional view of my improved burner, partly broken away. Fig. 2 is a like view of a modified form. Fig. 3 is a cross-sectional view, in reduced form, of the air-tube or mixing-chamber, showing by tangent lines various angles at which the gas, steam, or air may be admitted to the mixing-chamber or air-tube.

My present invention is an improvement on that shown in an application filed by me August 11, 1902, Serial No. 119,226, and the present application relates particularly to feeding the gas into the burner at an angle to the axis and tangentially to the walls of the mixing-chamber or air-tube and the means for regulating or controlling the amount of gas admitted to the mixing-chamber. While I have shown and described the gas, air, or steam as being fed into the burner at various angles, I find in practice the best results are obtained by spirally feeding the gas into the mixing-chamber or air-tube.

To put my invention into practice, I provide a tubular body 1, which forms the mixing-chamber, said body being open at both ends and receiving the air at its end 2, the amount of air admitted being controlled or regulated by means of an air-regulating shutter 3, eccentrically mounted, so as to be moved to partially close or entirely close the air-inlet, as desired. This body, which forms the mixing-chamber, is provided with a plurality of circumferentially-arranged openings made around the body. The respective rows of openings 4, 5, and 6 are for the admission of gas to the mixing-chamber, while the row of openings 7 is for the admission of steam to said mixing-chamber. Each opening is made through the tubular body at an angle to the longitudinal axis and tangentially to the inner wall thereof, whereby the gas and steam admitted through the openings will be projected on a tangent to the inner wall and at an angle to the longitudinal axis of the tube, as best seen in Fig. 3, thus imparting a spiral or angular movement to the volume of gas and steam admitted, which movement is continued by the column to the point of ignition. The respective rows of openings 4, 5, and 6 are preferably of differential sizes—that is, the row of openings 4 are of one size, the row 5 of a different size, and the row 6 still a different size—and while the volume of gas admitted through the respective rows of openings will vary, due to the difference in the size of the openings, I provide means whereby the gas may be admitted into the mixing-chamber through any one or any two of the rows of openings or all of the same, as may be required or desired.

Mounted on the body 1 by sleeving the same thereon or any other suitable means is a sleeve or collar 8, provided on its inner circumference with annular recesses 9, 10, and 11, respectively, for the respective rows of openings 4, 5, and 6 and with an annular steam-receiving recess 12 to admit steam through the opening 7. A steam-supply pipe 14 connects with the sleeve or fitting 8 and communicates with the annular steam-receiving space or recess 12. The sleeve or fitting 8 is constructed on one side, preferably on that opposite to the steam-inlet, with a boss or enlargement 15, in which is a gas-receiving chamber 16, with which the gas-inlet pipe 17 communicates. Inlet-ports 18, 19, and 20 establish communication between the chamber 16 and the respective annular gas-receiving recesses 9, 10, and 11, the walls of these ports being beveled at the upper ends to form valve-seats for the reception of the respective valves 21, 22, and 23. Any regulation as to the quantity of steam to be admitted may be accomplished by means of a controlling-cock (not shown) in the steam-inlet pipe 14. It is to be observed that with this construction gas may be admitted from the chamber 16 through one row of openings by opening the controlling-valve thereof, or any two of the rows of openings may be placed in communication with the gas chamber or chest, or all of the rows of openings, as may be desired. The gas admitted into the annular receiving-recesses and also the steam admitted to the recess 12 are fed through the angularly or spirally arranged openings and discharged into the mixing-chamber in a manner best seen in Fig. 3, being projected, preferably, in a spiral form, in which manner it travels through the body or mixing-chamber, giving an impetus to the volume of gas, whereby to convey it to the point of ignition in a more rapid and effective manner and increasing thereby the efficiency of the burner.

In Fig. 2 I show a modified form of construction in which the mixing-chamber or body of the burner is made in two members 24 25, each of which is provided on its periphery with a threaded portion and which are joined together by the sleeve or fitting 26 threaded thereon. This sleeve or fitting has an inlet 27 for the gas, which inlet communicates with an annular recess or receiving-chamber 28. The sleeve or fitting is also provided with an annular steam-receiving recess or chamber 29, communicating with the steam-inlet 30. The member 25 is provided with one or more rows of angularly or spirally arranged openings 31 32, while the member 24 is provided with a plurality of openings 33, arranged circumferentially around the member and communicating with the annular steam-receiving recess 29. The member 25 is tapered at its engaging end and fits in the interiorly-beveled engaging end of the member 24, while the annular portion 34 of the sleeve or fitting acts as a valve for the closing of the rows of openings 31 32, whereby to regulate or control the quantity of gas admitted through said openings, while the steam is shut off by turning in the member 24, whereby to bring the openings 33 over the tapered end of the member 25. The outer end of the member 25 may be provided with recesses or openings 38 to receive a spanner for adjustment of the member to regulate the amount of gas admitted through the openings 31 32 into the mixing-chamber, and this end of the burner may also, if desired, be provided with a suitable air-shutter, as shown in Fig. 1. The openings in this construction are made at an incline, whereby to project the gas and steam into the mixing-chamber at a tangent and impart a spiral or angular movement to the volume as it passes through the burner to the point of ignition, as in the form shown in Fig. 1.

The principle, therefore, of imparting the spiral or angular movement to the volume of combustibles is the same in both constructions shown and described, and also in both of the constructions it is evident that the volume of gas admitted to the mixing-chamber may be readily controlled without affecting the velocity, since it is apparent that if the pressure in the supply-pipe leading to the burner is constant, as is usual, the opening or closing to a greater or less extent of the valves controlling the passage of gas from the gas-chamber to the mixing-chamber will permit more or less gas to pass to the mixing-chamber at the same speed, rate of travel, or velocity, and consequently while I have herein shown and described preferable embodiments of my invention as it has been practiced by me, yet it will be evident that various slight changes may be made in the details of construction in carrying out the invention without departing from the spirit of the invention involved.

Having fully described my invention, what I claim as new, and desire to secure by Letters Patent, is—

1. In a fuel-burner the combination of a hollow tube constituting a mixing-chamber and provided with circumferentially-arranged openings passing through the walls of the tube tangentially thereto, and terminating at the inner surface of the tube and discharging directly thereinto, with a separate sleeve or fitting mounted on said tube and provided with an annular recess communicating with said openings, a fluid-inlet pipe in communication with said recess and means for controlling the quantity of fluid admitted to the recess.

2. The combination with a hollow body constituting an air-tube and a mixing-chamber, and provided with a plurality of rows of circumferentially-arranged openings extending therethrough, of a sleeve or fitting mounted on the body and provided with interior annular recesses communicating with the respective rows of openings, a gas-inlet, a gas chamber or chest in the sleeve or fitting in communication with the gas-inlet, ports between said chamber or chest and the annular recesses in the sleeve or fitting, and means for separately controlling the respective ports, substantially as described.

3. The combination of a hollow body constituting an air-tube and a mixing-chamber, said body having a plurality of circumferentially-arranged rows of openings extending through the body, a sleeve or fitting mounted on the body and provided with annular recesses communicating with the rows of openings, a gas chest or chamber in the fitting, and valves controlling the inlet of the gas from said chest to the respective annular recesses and rows of openings, substantially as described.

4. The combination of a hollow body constituting an air-tube and a mixing-chamber, and provided with a plurality of circumferentially-arranged openings extending therethrough, said body having steam-inlet openings also extending through the body, a fitting or sleeve mounted on the body and provided with annular recesses communicating with the respective rows of openings and the steam-inlet openings, a steam-inlet, a gas-inlet, a gas chamber or chest in the fitting or sleeve, and means for independently controlling the volume of gas admitted through each row of openings without decreasing the velocity, substantially as described.

5. The combination of a hollow body constituting an air-tube and a mixing-chamber, and provided with circumferentially-arranged openings extending therethrough at an angle to the radii and tangential to the axis of said air-tube for projecting the fluid tangentially into the chamber to impart a spiral movement thereto, a fluid-inlet, a fluid chest or chamber in communication with the inlet, and means between the openings and the chest or chamber for controlling the volume of fluid admitted through the openings without decreasing the velocity, substantially as described.

6. In a fuel-burner, a cylindrical metallic pipe or tube constituting a mixing-chamber and having circumferentially-disposed openings extending through its walls and terminating at the inner surface of the pipe or tube, said openings passing through the wall of the tube tangentially to the longitudinal axis of the same and means for controlling the volume of gas admitted through said openings to the mixing-chamber.

7. In a fuel-burner, the combination of a hollow body constituting an air-tube and a mixing-chamber, and provided with one or more rows of openings extending through the body at an angle tangential to the axis of the tube, and means carried by the body for controlling the volume of combustibles admitted through said openings to the air-tube or mixing-chamber.

8. In a fuel-burner, the combination of a hollow body constituting an air-tube and a mixing-chamber, and provided with a plurality of rows of circumferentially-arranged openings extending through the body at an angle to the axis of the tube, a hollow sleeve or fitting connected to the body and provided with an inlet for the combustibles, and means for controlling the volume of combustibles admitted through the sleeve and openings to the air-tube or mixing-chamber.

In testimony whereof I affix my signature in the presence of two witnesses.

EMMER F. GWYNN.

Witnesses:
H. C. EVERT,
H. H. CLEMENT.